United States Patent
Lentz et al.

(10) Patent No.: US 10,287,470 B2
(45) Date of Patent: May 14, 2019

(54) MICROCAPSULES AND MACROCAPSULES HAVING LOW REMNANT FREE FORMALDEHYDE MICROCAPSULES AND METHODS OF MAKING SAME

(71) Applicant: MICROTEK LABORATORIES, INC., Dayton, OH (US)

(72) Inventors: Carl M. Lentz, Waynesville, OH (US); David R. Virgallito, Beavercreek, OH (US); Jerry K. Lawson, Kettering, OH (US)

(73) Assignee: Microtek Laboratories, INC., Dayton, OH (US)

(*) Notice: Subject to any disclaimer, the term of this patent is extended or adjusted under 35 U.S.C. 154(b) by 0 days.

(21) Appl. No.: 15/991,839

(22) Filed: May 29, 2018

(65) Prior Publication Data

US 2018/0273820 A1    Sep. 27, 2018

Related U.S. Application Data

(63) Continuation of application No. 15/240,435, filed on Aug. 18, 2016, now Pat. No. 10,005,059.

(60) Provisional application No. 62/206,367, filed on Aug. 18, 2015.

(51) Int. Cl.
| | |
|---|---|
| *B01J 13/14* | (2006.01) |
| *C09K 5/06* | (2006.01) |
| *F28D 20/02* | (2006.01) |
| *B01J 13/18* | (2006.01) |
| *C08G 12/32* | (2006.01) |

(52) U.S. Cl.
CPC ............... *C09K 5/063* (2013.01); *B01J 13/14* (2013.01); *B01J 13/18* (2013.01); *F28D 20/023* (2013.01); *C08G 12/32* (2013.01); *Y02E 60/145* (2013.01)

(58) Field of Classification Search
CPC .......... B01J 13/14; B01J 13/18; C09K 5/063; F28D 20/023; C08G 12/32; Y02E 60/145
See application file for complete search history.

(56) References Cited

FOREIGN PATENT DOCUMENTS

| | | | |
|---|---|---|---|
| CN | 103154064 A | | 6/2013 |
| CN | 103752241 | * | 4/2014 |

OTHER PUBLICATIONS

"Fabrication and Thermal Properties of Micro PCMs: Used Melamine-Formaldehyde Resin as Shell Material", Journal of Applied Polymer Science, vol. 101, pp. 1522-1528 (2006).*
Shan, X. L. et al. "Formaldehyde-Free and Thermal Resistant Microcapsules containing n-Octadecane", Thermochimica Acta, vol. 494, pp. 104-109 (2009).*
Li, W. et al. "Preparation and Characterization of Microencapsulated Phase Change Materials With Low Remnant Formaldehyde Content", Materials Chemistry and Physics, vol. 106, pp. 437-442 (2007).*
Su, J-F et al. "High Impact Melamine-Formaldehyde Micro PCMs containing n-Octadecane Fabricated by a Two-Step Coacervation Method", Colloid and Polymer Science, vol. 285, pp. 1581-1591 (2007).*
Sun G. et al. "Mechanical Properties of Melamine-Formaldehyde Microcapsules", Journal of Microencapsulation, vol. 18, pp. 593-602 (2001).*
Salzun, F. et al. "Influence of Core Materials on Thermal Properties of Melamine Formaldehyde Microcapsules", European Polymer Journal, vol. 44, pp. 849-860 (2008).*
And Su, J. et al. "Fabrication and Thermal Properties of Micro PCMs: Used Melamine-Formaldehyde Resin as Shell Material", Journal of Applied Polymer Science, vol. 101, pp. 1522-1528 (2006).*
Amino Coating Resins: Their Invention and Reinvention, Cytec Industries Inc., 1995, pp. 24-25, 34-35.
CN, First Office Action; Chinese Application No. 2016800478114 (dated Jan. 7, 2019).
CN, First Office Action Search Report; Chinese Application No. 2016800478114 (dated Jan. 7, 2019).

* cited by examiner

*Primary Examiner* — Irina S Zemel
(74) *Attorney, Agent, or Firm* — FisherBroyles, LLP; Susan M. Oiler

(57) ABSTRACT

A microcapsule or microcapsule having a polymer wall comprising a melamine formaldehyde reacted with a crosslinking agent to form a unit cell according to a general formula (II) and/or the polymer wall has a FT-IR Spectrum as shown in FIG. 4. The crosslinking agent is a mixture of a reaction product of a cyclic urea (U) and a multifunctional aldehyde (A), and at least one crosslinker selected from the following group: a reaction products of (i) an aminotriazine and at least one aldehyde selected from the group consisting of aliphatic monoaldehydes and multifunctional aliphatic aldehydes, (ii) urea and/or cyclic ureas and formaldehyde, or (iii) phenols and aliphatic monoaldehydes, or from alkoxycarbonylaminotriazines, or multifunctional isocyanates, epoxides, aziridines, and carbodiimides.

28 Claims, 9 Drawing Sheets

| Batch | Free wax,% | 10% Wt loss TGA, °C | M Peak °C | M ΔH (J/g) | F Peak °C | F ΔH (J/g) | Free HCHO, % day 1 | Free HCHO, % 1 week | Free HCHO, % 3 weeks | Free HCHO, % 4 weeks | Comments |
|---|---|---|---|---|---|---|---|---|---|---|---|
| 120-097 | 0.28% | 6.7%/389.55 | 28.57 | 188.40 | 17.70 | -187.95 | 0.0008 | 0.0034 | 0.0038 | 0.0027 | 60% Cymel 385/40% Crosslinker wet wt. (added 10 minute before 1st addition) |
| 117-186 | 0.14% | 398.2 | 27.96 | 167.15 | 18.24 | -168.52 | 0.067 | 0.0682 | 0.071 | 0.0501 | Control (no Urea added) |
| 120-098 | 0.29% | 397.92 | 28.42 | 176.58 | 18.35 | -177.69 | 0.0034 | 0.0042 | 0.0032 | 0.0031 | 75% Cymel 385/25% Crosslinker wet wt. (added 10 minute before 1st addition) |
| 120-099 | 0.42% | 7.5%/397.5 | 28.27 | 189.86 | 18.67 | -188.86 | 0.0018 | 0.0029 | 0.0028 | 0.0025 | 70% Cymel 385/30% Crosslinker wet wt. (added 10 minute before 1st addition) |
| 120-105 | 0.86% | 323.00 | 28.62 | 187.71 | 18.24 | -187.45 | 0.0008 | 0.0022 | 0.0018 | 0.0008 | 50% Cymel 385/50% Crosslinker wet wt. (added 10 minute before 1st addition) |
| 122-003 | 0.42 | 367.06 | 27.73 | 178.8 | 18.3 | 180.27 | 0.0125 | 0.0139 | 0.0255 | 0.0183 | Control (normal Urea amount) |
| 120-106 | 8.71% | 409.82 | 29.68 | 199.52 | 17.24 | -199.51 | 0.0003 | 0.0015 | 0.0007 | 0.0007 | 40% Cymel 385/60% Crosslinker wet wt. (added 10 minute before 1st addition) |

FIG. 3

| | Peak | Intensity | Corr. Intensity | Base (H) | Base (L) | Area | Corr. Area | Comment |
|---|---|---|---|---|---|---|---|---|
| 1 | 1337.69 | 47.63 | 15.80 | 1374.34 | 1228.71 | 5579.143 | 827.396 | |
| 2 | 1465.96 | 39.32 | 2.95 | 1475.61 | 1459.21 | 965.297 | 24.775 | |
| 3 | 1487.18 | 43.41 | 2.32 | 1519.01 | 1475.61 | 2369.903 | 53.834 | |
| 4 | 1546.98 | 43.84 | 10.13 | 1636.67 | 1523.83 | 4978.748 | 611.149 | |
| 5 | 2921.32 | 49.40 | 31.75 | 2948.32 | 2879.85 | 2109.058 | 835.274 | |

MICROCAPSULES AND MACROCAPSULES HAVING LOW REMNANT FREE FORMALDEHYDE MICROCAPSULES AND METHODS OF MAKING SAME

RELATED APPLICATIONS

This application is a continuation of U.S. application Ser. No. 15/240,435, filed Aug. 18, 2016, which claims the benefit of U.S. Provisional Application No. 62/206,367, filed Aug. 18, 2015, the entirety of which is incorporated herein by reference.

TECHNICAL FIELD

The present application relates to microcapsules having a hydrophobic core material within a melamine formaldehyde shell and methods of making such microcapsules that have low remnant free formaldehyde, more particularly, adding a crosslinking agent that is a reaction product of a cyclic urea and a multifunctional aldehyde to the aqueous emulsion prior to the addition of the melamine formaldehyde resin.

BACKGROUND

Microcapsules can be constructed of various types of wall or shell materials to house varying core material for many purposes. The encapsulation process is commonly referred to as microencapsulation. Microencapsulation is the process of surrounding or enveloping one substance, often referred to as the core material, within another substance, often referred to as the wall, shell, or capsule, on a very small scale. The scale for microcapsules may be particles with diameters in the range between 1 and 1000 μm that consist of a core material and a covering shell. The microcapsules may be spherically shaped, with a continuous wall surrounding the core, while others may be asymmetrical and variably shaped.

General encapsulation processes include emulsion polymerization, bulk polymerization, solution polymerization, and/or suspension polymerization and typically include a catalyst. Emulsion polymerization occurs in a water/oil or oil/water mixed phase. Bulk polymerization is carried out in the absence of solvent. Solution polymerization is carried out in a solvent in which both the monomer and subsequent polymer are soluble. Suspension polymerization is carried out in the presence of a solvent (usually water) in which the monomer is insoluble and in which it is suspended by agitation. To prevent the droplets of monomers from coalescing and to prevent the polymer from coagulating, protective colloids are typically added.

Through a selection of the core and shell material, it is possible to obtain microcapsules with a variety of functions. This is why microcapsules can be defined as containers, which can release, protect and/or mask various kinds of active core materials. Microencapsulation is mainly used for the separation of the core material from the environment, but it can also be used for controlled release of core material in the environment. Microencapsulation has attracted a large interest in the field of phase change materials (PCMs). A PCM is a substance with a high heat of fusion, melting and solidifying at a certain temperature, which is capable of storing and releasing large amounts of energy. Heat is absorbed or released when the material changes from solid to liquid and vice versa; thus, PCMs are classified as latent heat storage units. The latent heat storage can be achieved through solid-solid, solid-liquid, solid-gas and liquid-gas phase change, but solid-liquid is typically used in thermal storage applications as being more stable than gas phase changes as a result of the significant change in volume occupied by the PCM.

Melamine-formaldehyde resin is often used as the shell material for encapsulating PCMs because of its good mechanical and thermal stability. Melamine-formaldehyde (MF) microcapsules can be prepared by the in situ polymerization process of polycondensation, where the melamine-formaldehyde prepolymer is initially soluble in the continuous water phase, while the hydrophobic core material is contained in dispersed droplets. As the polymerization reaction starts in the aqueous solution, the formed oligomers start to collapse on the surface of the core droplets. On the surface, the polymerization continues and crosslinking occurs, which results in a solid MF shell formation. The shell formation and the amount of free formaldehyde present in the capsule have been shown to be related to various factors such as the pH, temperature, type and the amount of emulsifier, and the molar ratio of melamine formaldehyde to emulsifier, which all affect thermal stability, shell morphology and remnant free formaldehyde.

The term "free formaldehyde" means those molecular forms present in aqueous solution capable of rapid equilibration with the native molecule, in the headspace over the solution. This includes the aqueous native molecule, its hydrated form methanediol and its polymerized hydrated form ($HO(CH_2O)$). Methanediol is a product of the hydration of formaldehyde $H_2C=O$, and predominates in water solution: the equilibrium constant being about $10^3$, and in a 5% by weight solution of formaldehyde in water, 80% is in the methanediol form.

Free formaldehyde is generated as a byproduct of the melamine-formaldehyde poly-condensation reaction and/or from a hydrolytic attack on the melamine formaldehyde polymer. The melamine formaldehyde polymer can continuously release formaldehyde under moist and acidic conditions; thus, free formaldehyde levels may increase over time due to residual curing, and hydrolysis of the end-groups, in the cross-linked microcapsule wall. In addition, the unreacted residual formaldehyde enclosed within the microcapsules can also be released via simple diffusion.

Attempts have been made to reduce remnant free formaldehyde. For example, formaldehyde scavengers have been introduced in one attempt to lower free formaldehyde levels. Urea has been shown to be an effective formaldehyde scavenger. It is believed that as well as being a formaldehyde scavenger, urea is able to undergo a cross-linking reaction with the polymeric wall of the microcapsules, and inhibit the release of free formaldehyde from the microcapsule wall. Hence, it is believed that urea can both reduce the generation of free formaldehyde, and scavenge any formaldehyde that is released into a slurry or composition. For instance, when the microcapsule wall is formed by cross-linking formaldehyde with melamine, it is believed that urea is able to react with the methylol groups of the melamine-formaldehyde polymeric wall, and inhibits the release of free formaldehyde from the microcapsule wall. Moreover, when the urea complexes with the microcapsule wall, particularly walls made from crosslinking urea, melamine, and mixtures thereof with formaldehyde, the wall is made less porous. As a consequence, leakage of the raw materials from the microcapsule core is reduced. When urea is used, the urea is preferably added directly to the microcapsule slurry. When urea is first added to the microcapsule slurry, a pH of less than 5.5 is particularly preferred for the microcapsule slurry, for improved formaldehyde scavenging and microcapsule wall stability.

Even with use of the most efficient formaldehyde scavengers, such as urea, there still exists the need for free formaldehyde reduction. In particular, reducing free formaldehyde from both interstitially bonded formaldehyde and formaldehyde due to hydrolysis (hydrolytic attack) is desirable. FIG. 1 shows both the initial amount of free formaldehyde present for a melamine urea formaldehyde microcapsule having a PCM core material. On Day 1, about 200 ppm of free formaldehyde for a wet cake was present at the beginning of the process, and the amount of formaldehyde rose over time, due to hydrolysis, and eventually fell after about Days 7-12, depending upon the drying method, as the hydrolysis process slowed and the formaldehyde which is volatile was eliminated.

Since the development of microencapsulated PCMs, there has been a constant need for improved microcapsules; in particular, there is a need for reductions in remnant free formaldehyde when melamine formaldehyde resins form the shell of the microcapsules, while maintaining acceptable thermostability and enthalpy values.

SUMMARY

In one aspect, methods for making melamine formaldehyde microcapsules having reduced initial remnant free formaldehyde and substantially similar reduced remnant free formaldehyde over time are disclosed. The methods result in microcapsules that have thermal stability, mechanical properties, and phase change behavior due to the thermal conductivity of the wall that are generally the same as for previous melamine formaldehyde systems, i.e., those without the crosslinking agent introduced as disclosed herein. This is very important since the product, resulting microcapsules, can be used as a drop in without modification of the systems for downstream use of the product.

One aspect of the methods for producing capsules includes the preparation of an emulsion comprising a surfactant, core material, and water, and the addition of a crosslinking agent thereto with subsequent homogenization to a selected particle size to form a generally homogenized emulsion. The crosslinking agent is a mixture of a reaction product of a cyclic urea (U) and a multifunctional aldehyde (A), and at least one crosslinker selected from the following group:
 (b1) reaction products of an aminotriazine and at least one aldehyde selected from the group consisting of aliphatic monoaldehydes and multifunctional aliphatic aldehydes having the structure $Y(CHO)_n$, where Y is an n-functional aliphatic residue, and n is greater than 1, where U is not dihydroxyethylene urea if the crosslinker (b) is (b1),
 (b2) reaction products of urea and/or cyclic ureas and formaldehyde,
 (b3) alkoxycarbonylaminotriazines,
 (b4) multifunctional isocyanates which may be partially or completely blocked,
 (b5) reaction products of phenols and aliphatic monoaldehydes,
 (b6) multifunctional epoxides,
 (b7) multifunctional aziridines, and
 (b8) multifunctional carbodiimides.
Any of the crosslinkers (a) and (b) which have hydroxyl groups are optionally etherified with one or more linear, branched, or cyclic aliphatic alcohols. Next, a melamine formaldehyde prepolymer is added to the homogenized emulsion with mixing, and is then polymerized to form the capsules, which may be microcapsules based on the particle size selected. In some embodiments, (b) is at least one crosslinker selected from the group consisting of (b1), (b2), (b3), and (b5).

In all variations of the methods, the resulting capsules have an FT-IR Spectrum as set forth in FIG. 2 and can have an average particle size selected from the range from about 10 μm to about 10000 μm.

In the methods, preparation of the emulsion may include preparing an aqueous phase comprising the surfactant and water, melting the phase change material, and, subsequent to melting the phase change material, adding the phase change material to the aqueous phase with mixing and heat. The addition of the melamine formaldehyde prepolymer can be done as a first addition of melamine formaldehyde prepolymer followed by a subsequent second addition of melamine formaldehyde prepolymer.

In one embodiment, the melamine formaldehyde prepolymer is present in a ratio by weight percent to the crosslinking agent of 1:1 to 4:1, and the resulting capsules have less than 100 ppm initial free formaldehyde.

In another embodiment, the melamine formaldehyde prepolymer is present in a ratio by weight percent to the crosslinking agent of 1.5:1 to 3.75:1, and the resulting capsules have less than 20 ppm initial free formaldehyde.

In yet another embodiment, the melamine formaldehyde prepolymer is present in a ratio by weight percent to the crosslinking agent of 1.5:1, and resulting capsules have less than 10 ppm initial free formaldehyde.

A second aspect of the methods for producing capsules includes the preparation of an emulsion comprising a surfactant, core material, and water, and preparation of a melamine formaldehyde prepolymer comprising a crosslinking agent. The crosslinking agent is a mixture of a reaction product of a cyclic urea (U) and a multifunctional aldehyde (A), and at least one crosslinker selected from the following group:
 (b1) reaction products of an aminotriazine and at least one aldehyde selected from the group consisting of aliphatic monoaldehydes and multifunctional aliphatic aldehydes having the structure $Y(CHO)_n$, where Y is an n-functional aliphatic residue, and n is greater than 1, where U is not dihydroxyethylene urea if the crosslinker (b) is (b1,
 (b2) reaction products of urea and/or cyclic ureas and formaldehyde,
 (b3) alkoxycarbonylaminotriazines,
 (b4) multifunctional isocyanates which may be partially or completely blocked,
 (b5) reaction products of phenols and aliphatic monoaldehydes,
 (b6) multifunctional epoxides,
 (b7) multifunctional aziridines, and
 (b8) multifunctional carbodiimides.
Any of the crosslinkers (a) and (b) which have hydroxyl groups are optionally etherified with one or more linear, branched, or cyclic aliphatic alcohols. Next, the melamine formaldehyde prepolymer comprising the crosslinking agent is added to the homogenized emulsion with mixing, and is then polymerized to form the capsules, which may be microcapsules based on the particle size selected. In some embodiments, (b) is at least one crosslinker selected from the group consisting of (b1), (b2), (b3), and (b5).

The addition of the melamine formaldehyde prepolymer comprising the crosslinking agent can be done as a first addition of melamine formaldehyde prepolymer followed by a subsequent second addition of melamine formaldehyde prepolymer. Alternately, only one of the first and second additions of melamine formaldehyde prepolymer includes the crosslinking agent with the prepolymer, such that the first addition, the second addition, or both thereof include the crosslinking agent.

In one embodiment, the melamine formaldehyde prepolymer is present in a ratio by weight percent to the crosslinking agent of 1:1 to 4:1.

In another embodiment, both the first addition and the second addition comprise the crosslinking agent, the melamine formaldehyde prepolymer is present in a ratio by weight percent to the crosslinking agent of 1.5:1 to 3.75:1, and the resulting capsules have less than 60 ppm initial free formaldehyde.

In another embodiment, both the first addition and the second addition comprise the crosslinking agent, the melamine formaldehyde prepolymer is present in a ratio by weight percent to the crosslinking agent of 1:1 to 1.5:1 and the resulting capsules have less than 40 ppm initial free formaldehyde.

In yet another embodiment, the first addition comprises the crosslinking agent, the melamine formaldehyde prepolymer is present in a ratio by weight percent to the crosslinking agent of 1:1 to 4:1, and resulting capsules have less than 45 ppm initial free formaldehyde.

In yet another embodiment, the second addition comprises the crosslinking agent, the melamine formaldehyde prepolymer is present in a ratio by weight percent to the crosslinking agent of 1:1 to 4:1, and the resulting capsules have less than 75 ppm initial free formaldehyde.

In yet another embodiment, the second addition comprises the crosslinking agent, the melamine formaldehyde prepolymer is present in a ratio by weight percent to the crosslinking agent of 1:1 to 1.5:1, and the resulting capsules have less than 40 ppm initial free formaldehyde.

In another aspect, capsules, microcapsules, and/or macrocapsules made according to any of the methods disclosed herein are disclosed.

BRIEF DESCRIPTION OF THE DRAWINGS

FIG. 3 is a table of data from trial evaluations performed on microcapsules formed by one of the disclosed methods.

DETAILED DESCRIPTION

The following detailed description will illustrate the general principles of the invention, examples of which are additionally illustrated in the accompanying drawings.

Methods are disclosed herein for producing capsules, in particular in situ polymerization methods. A first aspect of a method for preparing capsules includes (1) preparing an emulsion of a surfactant, core material, and water, then (2) adding a crosslinking agent to the emulsion, the crosslinking agent being a mixture of:

(a) a reaction product of a cyclic urea (U) and a multifunctional aldehyde (A), and (b) at least one crosslinker selected from the group consisting of (b1) reaction products of an aminotriazine and at least one aldehyde selected from the group consisting of aliphatic monoaldehydes and multifunctional aliphatic aldehydes having the structure $Y(CHO)_n$, where Y is an n-functional aliphatic residue, and n is greater than 1, where U is not dihydroxyethylene urea if the crosslinker (b) is (b1), (b2) reaction products of urea and/or cyclic ureas and formaldehyde, (b3) alkoxycarbonylaminotriazines, (b4) multifunctional isocyanates which may be partially or completely blocked, (b5) reaction products of phenols and aliphatic monoaldehydes, (b6) multifunctional epoxides, (b7) multifunctional aziridines, (b8) multifunctional carbodiimides, wherein any of the crosslinkers (a) and (b) which have hydroxyl groups may be etherified with one or more linear, branched, or cyclic aliphatic alcohols, (3) homogenizing the crosslinking agent into the emulsion to a selected particle size, and (4) adding a melamine formaldehyde prepolymer to the homogenized emulsion with mixing, and polymerizing the melamine formaldehyde prepolymer by adjusting the pH and/or addition of urea, thereby forming a polymerized shell surrounding core material in capsule form. In any aspect of the methods, (b) is more preferably at least one crosslinker selected from the group consisting of (b1), (b2), (b3), and (b5). The melamine formaldehyde prepolymer is present in a ratio by weight percent to the crosslinking agent of 1:1 to 4:1, more preferably 1.5:1 to 3.75:1.

Further, the first aspect of the methods may include preparing an aqueous phase comprising the surfactant and water, melting the phase change material as a core phase, and, subsequent to melting the phase change material, adding the core phase to the aqueous phase with mixing and heat. Here, the adding of the melamine formaldehyde prepolymer occurs as a first addition of melamine formaldehyde prepolymer followed by a subsequent second addition of melamine formaldehyde prepolymer.

Figure 1:
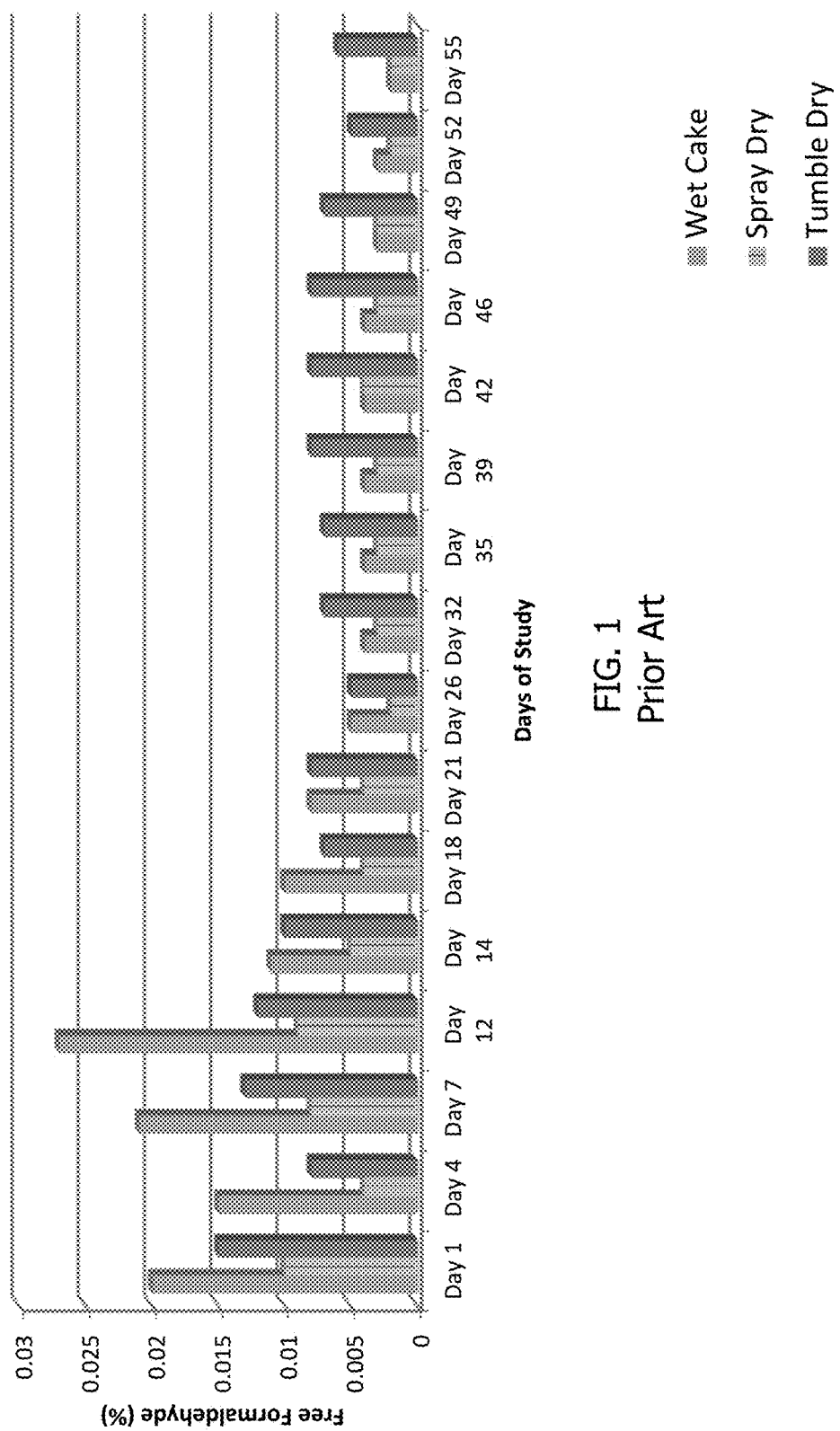
FIG. 1 is a bar graph of an aging study of melamine urea formaldehyde microcapsules with a PCM core material comparing the amount of free formaldehyde based on whether the material was a wet cake, spray dried, or tumbled dry.
Figure 2:
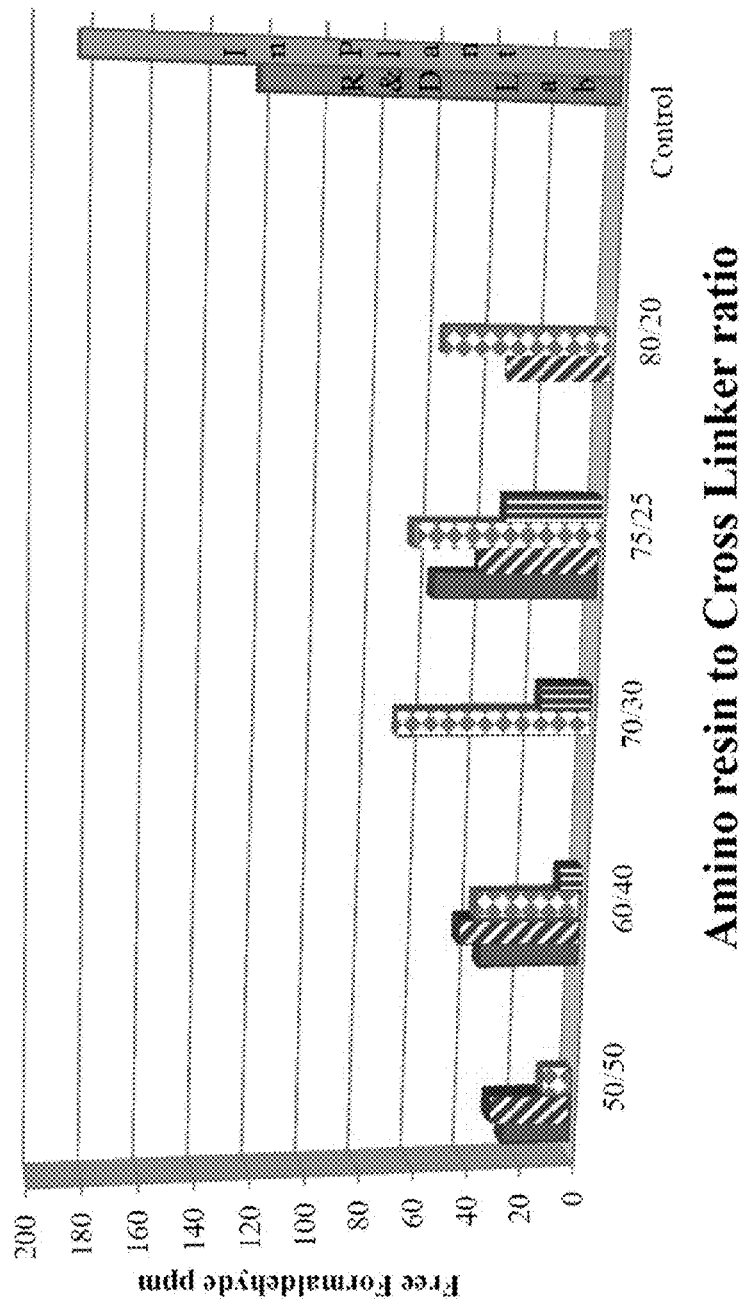
FIG. 2 is a bar graph of free formaldehyde based on the method of addition of the crosslinking agent and the concentration of the amino resin to crosslinking agent.

Now referring to FIG. 2, capsules made by the first aspect of the methods have an initial free formaldehyde level of less than 100 ppm, more preferably less than 40 ppm, less than 20 ppm, and even more preferably less than 10 ppm. The initial free formaldehyde levels of less than 100 ppm and less than 40 ppm are achievable with the melamine formaldehyde prepolymer present in a ratio by weight percent to the crosslinking agent of 1:1 to 4:1. The initial free formaldehyde levels of less than 20 ppm are achievable with the melamine formaldehyde prepolymer present in a ratio by weight percent to the crosslinking agent of 1.5:1 to 2.33:1. The initial free formaldehyde levels of less than 10 ppm are achievable with the melamine formaldehyde prepolymer present in a ratio by weight percent to the crosslinking agent of 1.5:1.

With reference to FIG. 3, the capsules made by the first aspect of the methods have free percent wax, enthalpy (M ΔH), 10% weight loss TGA, etc. that are well suited for practical applications as capsules. It is important not to sacrifice the properties of capsules as the amount of free formaldehyde is reduced. An aspect of any of the methods is not only the fact that the free formaldehyde levels are significantly reduced, but also that the properties of high enthalpy, low free unencapsulated core material, and high thermal stability are maintained. As shown in FIG. 3, compared to the uncrosslinked capsule, the enthalpies are as high or higher, where the enthalpy is a measure of the available latent heat. The thermal stability as measured by the temperature at which you see a 10% weight loss is as high or higher than capsules made without the crosslinking agent, and the amount of unencapsulated core material is very low. The mechanical stability of the capsules also has not been affected. This was determined by measuring the amount of encapsulated core material before and after a simulated mechanical drying process. The amount of unencapsulated core material which indicates the amount of broken capsules was measured, and it was determined not to have increased.

A second aspect of methods for preparing capsules includes (1) preparing an emulsion comprising a surfactant, core material, and water, (2) preparing a melamine formaldehyde prepolymer comprising a crosslinking agent, the crosslinking agent being a mixture of:
  (a) a reaction product of a cyclic urea (U) and a multifunctional aldehyde (A), and
  (b) at least one crosslinker selected from the group consisting of
    (b1) reaction products of an aminotriazine and at least one aldehyde selected from the group consisting of aliphatic monoaldehydes and multifunctional aliphatic aldehydes having the structure $Y(CHO)_n$, where Y is an n-functional aliphatic residue, and n is greater than 1, where U is not dihydroxyethylene urea if the crosslinker (b) is (b1),
    (b2) reaction products of urea and/or cyclic ureas and formaldehyde,
    (b3) alkoxycarbonylaminotriazines,
    (b4) multifunctional isocyanates which may be partially or completely blocked,
    (b5) reaction products of phenols and aliphatic monoaldehydes,
    (b6) multifunctional epoxides,
    (b7) multifunctional aziridines,
    (b8) multifunctional carbodiimides,
wherein any of the crosslinkers (a) and (b) which have hydroxyl groups may be etherified with one or more linear, branched, or cyclic aliphatic alcohols, (3) adding the melamine formaldehyde prepolymer to the emulsion with mixing, and (4) polymerizing the melamine formaldehyde prepolymer by adjusting the pH and/or addition of urea, thereby forming a polymerized shell surrounding core material in capsule form. Here, adding the melamine formaldehyde prepolymer may include a first addition of melamine formaldehyde prepolymer followed by a subsequent second addition of melamine formaldehyde prepolymer, wherein the first addition, the second addition or both the first and the second addition comprise the crosslinking agent. In any these second aspect of the methods, (b) is more preferably at least one crosslinker selected from the group consisting of (b1), (b2), (b3), and (b5), and the melamine formaldehyde prepolymer is present in a ratio by weight percent to the crosslinking agent of 1:1 to 4:1, more preferably 1.5:1 to 3.75:1.

Now referring to FIG. 2, when both the first addition and the second addition include the crosslinking agent, the melamine formaldehyde prepolymer is more preferably present in a ratio by weight percent to the crosslinking agent of 1:1 to 1.5:1. When just the first addition includes the crosslinking agent, the melamine formaldehyde prepolymer is more preferably present in a ratio by weight percent to the crosslinking agent of 1:1 to 4:1. When just the second addition includes the crosslinking agent, the melamine formaldehyde prepolymer is more preferably present in a ratio by weight percent to the crosslinking agent of 1:1 to 1.5:1.

Still referring to FIG. 2, capsules made by any of these second aspects of the methods have an initial free formaldehyde level of less than 100 ppm, more preferably less than 80 ppm, less than 60 ppm, and even more preferably less than 40 ppm. The initial free formaldehyde levels of less than 100 ppm and less than 80 ppm are achievable with the melamine formaldehyde prepolymer present in a ratio by weight percent to the crosslinking agent of 1:1 to 4:1. The initial free formaldehyde levels of less than 60 ppm are achievable for each of the second aspects of the methods with the melamine formaldehyde prepolymer present in a ratio by weight percent to the crosslinking agent of 1:1 to 1.5:1. The initial free formaldehyde levels of less than 45 ppm are achievable for each of the second aspects of the methods with the melamine formaldehyde prepolymer present in a ratio by weight percent to the crosslinking agent of 1:1 to 1.5:1.

In comparing the free formaldehyde results for the capsules made by the first aspect of the methods and each of the second aspects of the methods, it was quite surprising that the lowest free formaldehyde level in the final isolated wet cake product was the lowest from capsules from the first aspect of the methods, i.e., those obtained by first allowing the crosslinking agent to interact with the emulsion of surfactant, water and the core material before the addition of amino resin. Not to be completely bound by theory, one can speculate that the reason for the remarkably low free formaldehyde levels and remarkably low release of formaldehyde by hydrolysis is that the crosslinking agent bound to the surfactant is efficiently delivered to the subsequently added amino resin in such a way as to react with the amino resin to tie up the sites that would result in formaldehyde from hydrolysis and also react in situ with formaldehyde that is released during the polymerization process.

Figure 4:
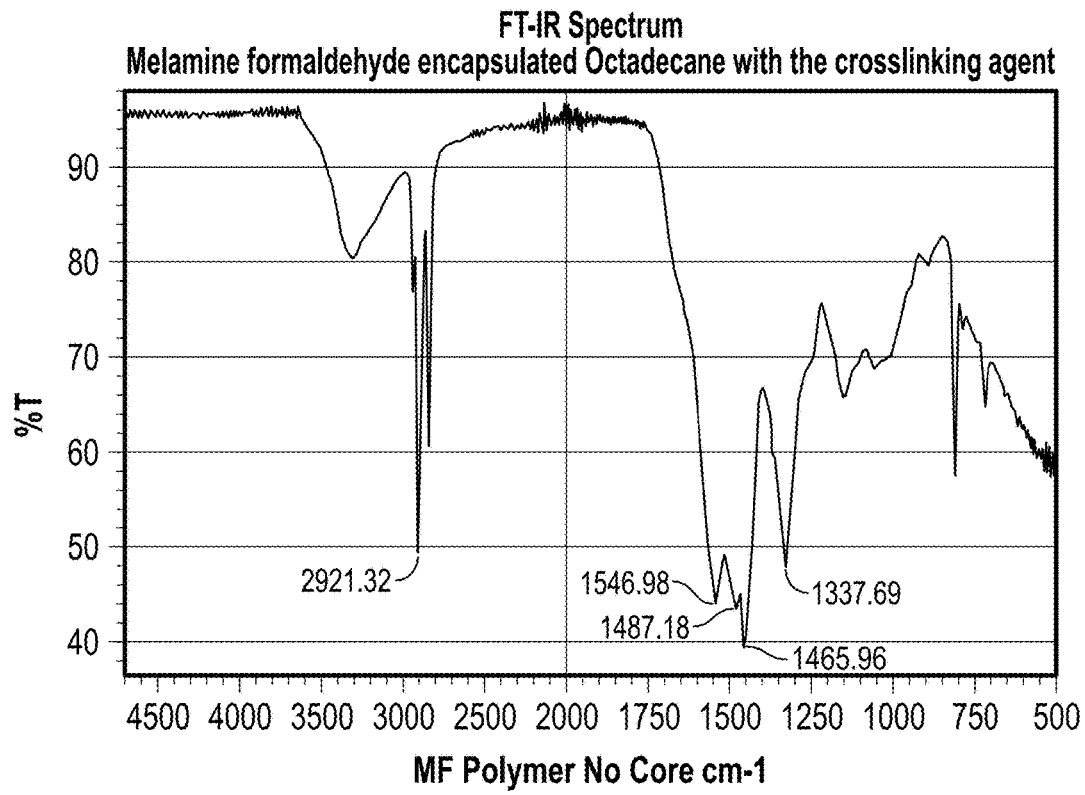
FIG. 4 is an FT-IR Spectrum for a capsule having an octadecane core material and an MF wall material made with the crosslinking agent as disclosed herein.
Figure 5:
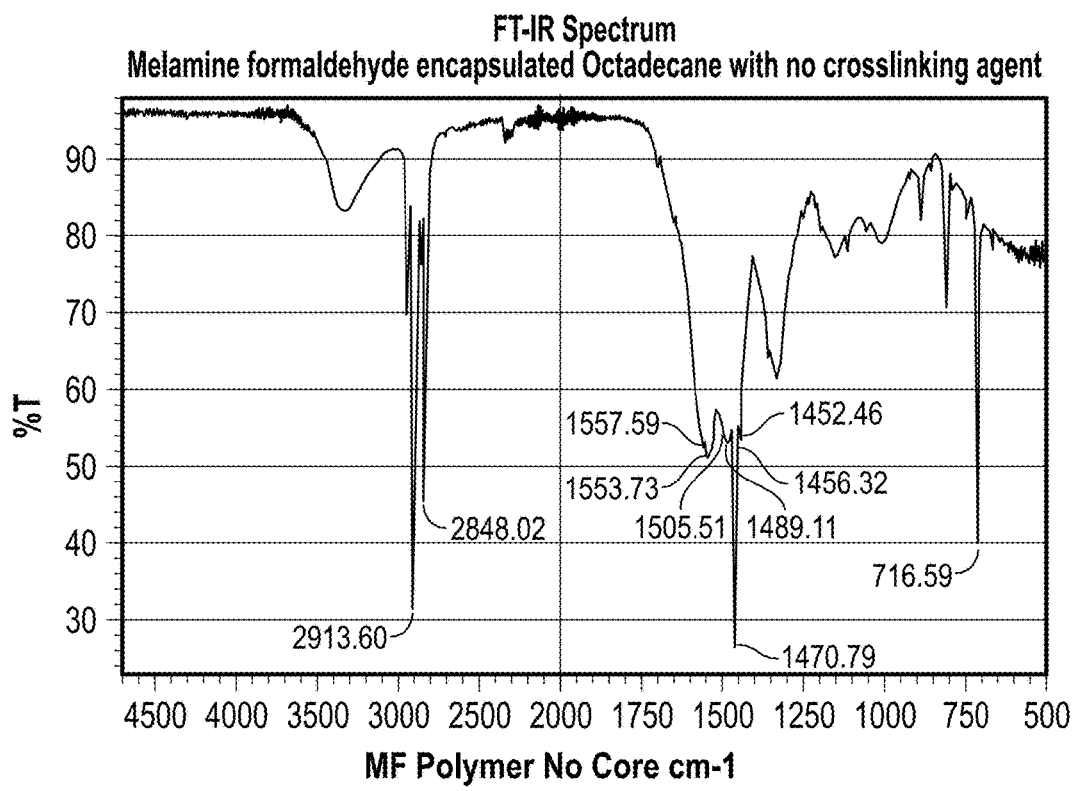
FIG. 5 is an FT-IR Spectrum for a capsule having an octadecane core material and an MF wall material made without the crosslinking agent as disclosed herein.
Figure 6:
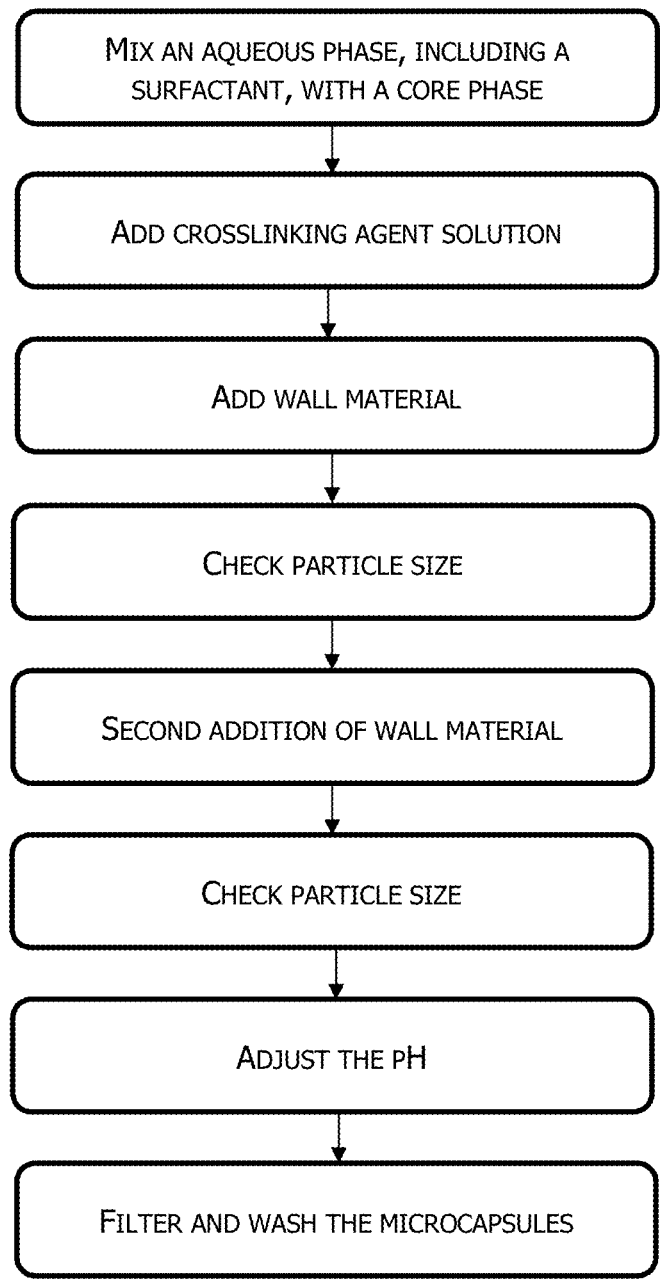
FIGS. 6-9 are flowcharts of four different embodiments of the methods disclosed herein.
Figure 7:
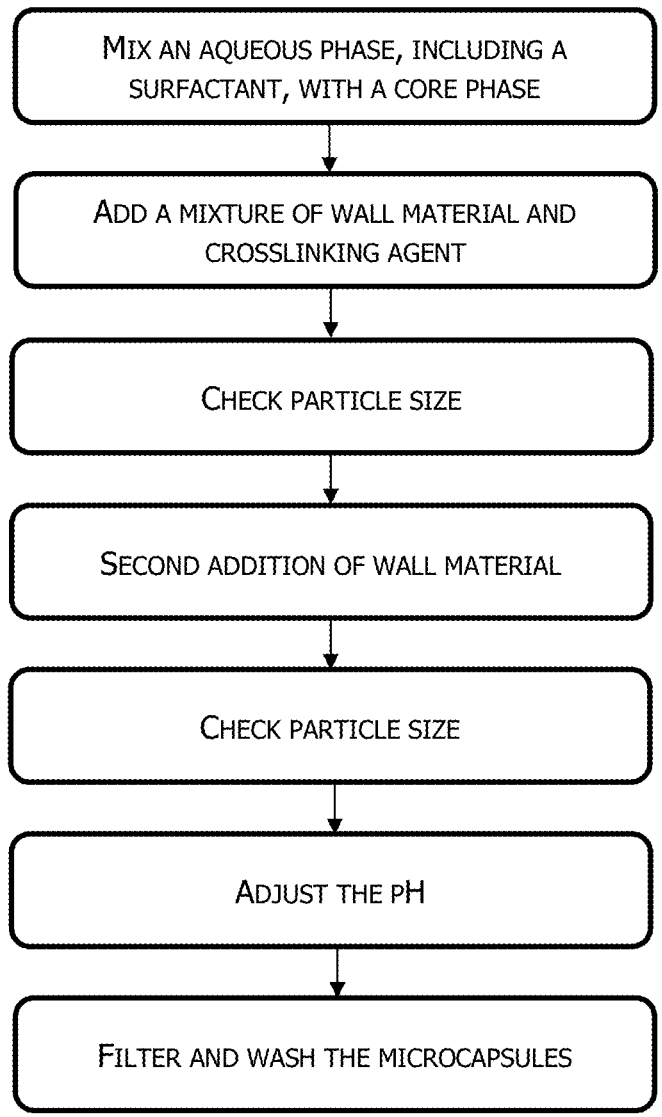
Figure 8:
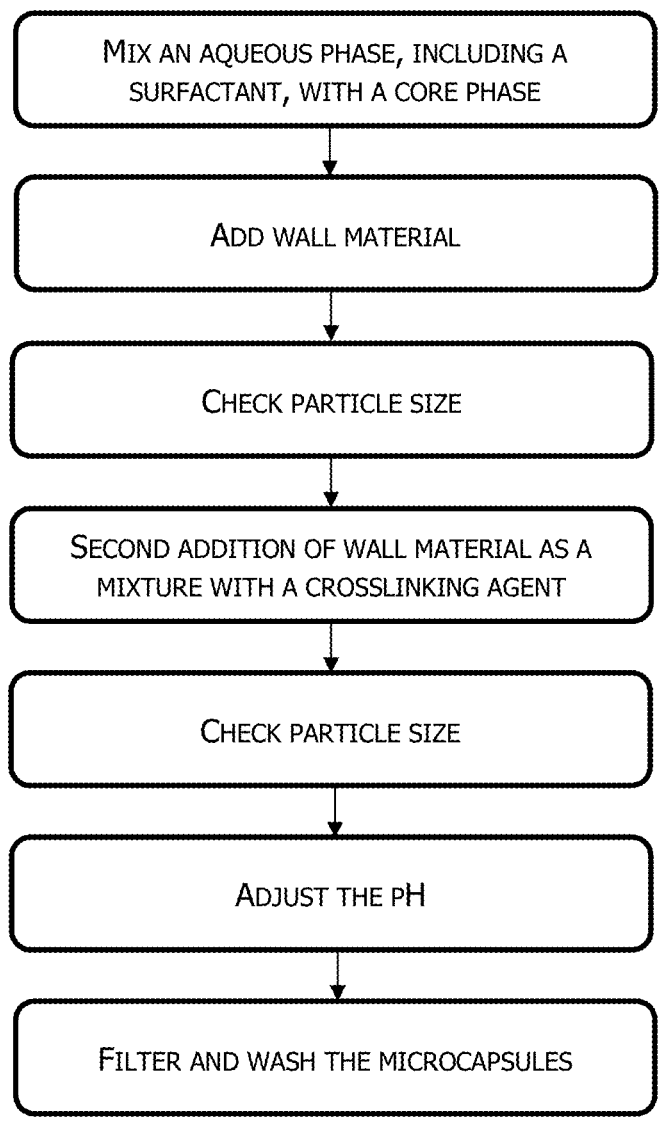
Figure 9:
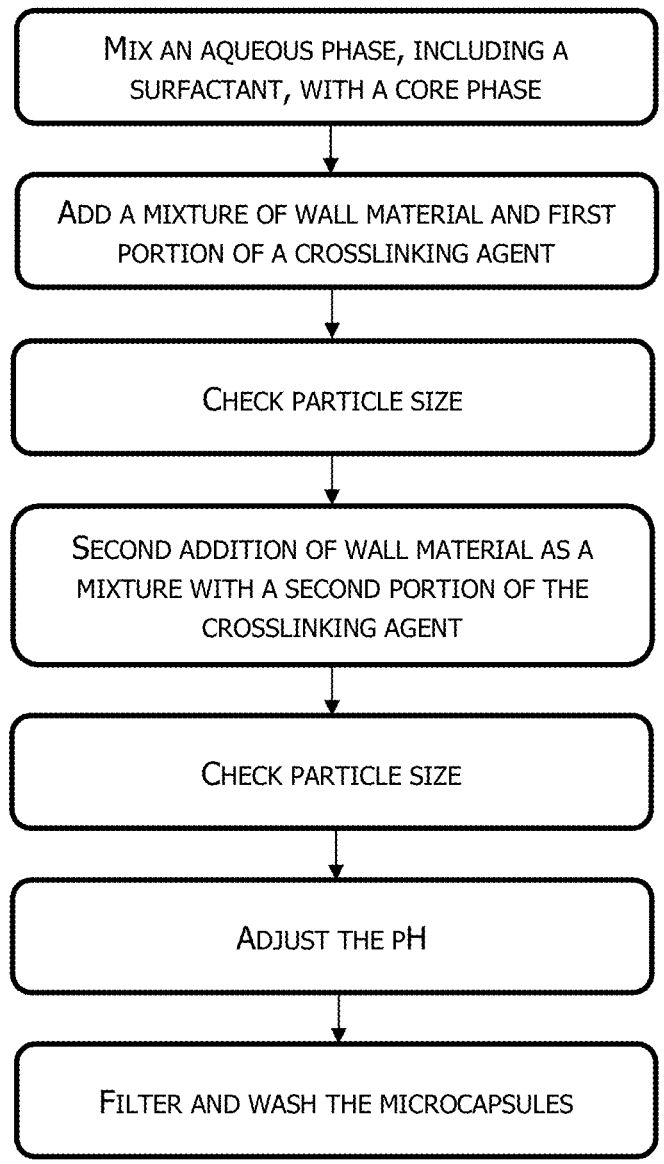

However, all the methods result in a different microcapsule than those made without the crosslinking agent. Capsules made by the first aspect and any of the second aspects of the methods have an FT-IR Spectrum as set forth in FIG. 4, which is clearly different from the FT-IR set forth in FIG. 5 for a capsule formed by generally the same method, but without the addition of the crosslinking agent. Significant differences are seen in the 1600 cm$^{-1}$, –1250 cm$^{-1}$ portion of the spectrum, which indicate a change in the structure of the polymer particularly involving the amine, ether and alcohol moieties associated with the polymer.

Surfactant

The surfactants useful herein are those substances that lower the surface tension (or interfacial tension) between two liquids or between a liquid and a solid, typically organic compounds that are amphiphilic, having a hydrophobic tail (a water insoluble or oil soluble portion) and a hydrophilic head (a water soluble portion). As can be appreciated, the surfactants form micelles in assisting in separating the core material into capsules for the formation of the wall material or shell in reaction with the surfactant, and those that are most useful herein are surfactants that form a stable micellular structure in the presence of the crosslinking agent.

The surfactants may be subdivided into groups based on the charge of the hydrophilic head: anionic heads, cationic, non-ionic heads, and zwitterionic heads. The anionic head group includes sulfate, sulfonate, phosphate, and carboxylate esters. Suitable alkyl sulfate esters include ammonium lauryl sulfate, sodium lauryl sulfate, sodium dodecyl sulfate, alkyl-ether sulfates, sodium laureate sulfate (also known as SLES (sodium lauryl ether sulfate)), and sodium myreth sulfate. Suitable sulfonates include dioctyl sodium sulfosuccinate, perfluorooctantsulfonate, perfluorobutantesulfonate, and linear alkylbenzene sulfonates. Further, suitable surfactants include alkyl-aryl ether phosphates and alkyl ether phosphate.

The cationic head group includes quaternary ammonium cationic surfactants. Several examples include, but are not limited to, alkyltrimethyl ammonium salts, cetyl trimethyl ammonium bromide, hexadecyl trimethyl ammonium bromide, cetyl trimethyl ammonium chloride, cetylpyridinium chloride, cetylpyridinium chloride, benzalkonium chloride, benzethonium chloride, 5-bromo-5-nitro-1,3,-dioxane, dimethyldioctadecyl ammonium chloride, cetrimonium bromide, and dioctadecyldimethylammonium bromide.

The zwitterionic head group includes compounds that have both cationic and anionic centers attached to the same molecule. The cationic part is based on primary, secondary, or tertiary amines or quaternary ammonium sulfates. The anionic part can include sulfonates, as in the sultaines: 3-[(3-cholamidopropyl)dimethylammonio]-1-propanesulfonate and cocamidopropyl hydroxysulatine; or can include betaines: cocamidopropyl betaine. Other suitable zwitterionic surfactants include phospholipids, phophatidylserine, phophatidylethanolamine, phosphatidylcholine, and sphingomyelins.

The nonionic head group includes many long chain alcohols, including fatty alcohols, cetyl alcohols, stearyl alcohols, cetostearyl alcohols, and oleyl alcohols. Examples include, but are not limited to, polyoxyethylene glycol alkyl ethers, octaethylene glycol monododecyl ether, pentaethyelen glycol monododecyl ether, polyoxypropylene glycol alkyl ethers, glucoside alkyl ethers, decyl glucoside, lauryl glucoside, octyl glucoside, polyoxyethylene glycol octylphenol ethers, polyoxyethylene glycol, alkyle phenol ethers, glycerol alkyl ethers, glyceryl laurate, polyoxyethylene glycol sorbitan alkyl esters, sorbitan alkyl esters, cocamide MEA, cocamide DEA, dodecyldimethylamide oxide, block copolymers of polyethylene glycol and polypropylene glycol.

The surfactant used in the examples below is obtained by the reaction of poly(ethylene alt maleic anhydride) polymer and diethyl amine in water. The range of surfactant concentration is from about 0.5% to about 10%, more preferably from about 1% to about 3% by weight based on the weight of the core material.

Core Material

The hydrophobic core material includes a heat-absorbing material that has a melting point at about $-30°$ C. to about $70°$ C. and is selected from a group consisting of straight chain alkanes, alcohols, organic acids, and aliphatic acid containing at least 6 carbon atoms. Examples of suitable hydrophobic core materials include, but are not limited to, aliphatic hydrocarbyl compounds such as saturated or unsaturated $C_{10}$-$C_{40}$ hydrocarbons, which are branched or preferably linear; cyclic hydrocarbons; aromatic hydrocarbyl compounds; $C_1$-$C_{40}$-alkyl-substituted aromatic hydrocarbons; saturated or unsaturated $C_6$-$C_{30}$-fatty acids; fatty alcohols; Cesters; and natural and synthetic waxes.

Examples of saturated or unsaturated $C_{10}$-$C_{40}$ hydrocarbons, which are branched or preferably linear, include, but are not limited to, n-tetradecane, n-pentadecane, n-hexadecane, n-heptadecane, n-octadecane, n-nonadecane, n-eicosane, n-heneicosane, n-docosane, n-tricosane, n-tetracosane, n-pentacosane, n-hexacosane, n-heptacosane, and n-octacosane. Examples of cyclic hydrocarbons include, but are not limited to, cyclohexane, cyclooctane, and cyclodecane. Examples of aromatic hydrocarbyl compounds include, but are not limited to, benzene, naphthalene, biphenyl, o- or n-terphenyl. Examples of $C_1$-$C_{40}$-alkyl-substituted aromatic hydrocarbons include, but are not limited to, dodecylbenzene, tetradecylbenzene, hexadecylbenzene, hexylnaphthalene or decyinaphthalene. Examples of saturated or unsaturated $C_6$-$C_{30}$-fatty acids include, but are not limited to, lauric, stearic, oleic or behenic acid, and eutectic mixtures of decanoic acid with myristic, palmitic or lauric acid. Examples of fatty alcohols include, but are not limited to, lauryl, stearyl, oleyl, myristyl, cetyl alcohol, mixtures such as coconut fatty alcohol, and the so-called oxo alcohols which are obtained by hydroformylation of $\alpha$-olefins and further reactions. Examples of Cesters include, but are not limited to, $C_1$-$C_{10}$-alkyl esters of fatty acids, such as propyl palmitate, methyl stearate or methyl palmitate, and their eutectic mixtures or methyl cinnamate. Examples of natural and synthetic waxes include, but are not limited to, montan acid waxes, montan ester waxes, polyethylene wax, oxidized waxes, polyvinyl ether wax, and ethylene vinyl acetate wax.

Nucleator

Homogenous nucleator examples include long chain fatty acids such as stearic acid, long chain fatty alcohols, such as a lauryl alcohol, polymers such as ethyl vinyl acetate, and microcrystalline waxes sold under the brand name, Vybar. The range for the amount of nucleator is about 0.5% to about 10%, more preferably about 1% to about 3% by weight based on the weight of the core material.

Crosslinking Agent

The crosslinking agent used in the examples herein was made available by Allnex USA Inc. The crosslinking agent is a mixture of (a) a reaction product UA of a cyclic urea U and a multifunctional aldehyde A with (b) other crosslinkers, in particular one or more of (b1) reaction products of an aminotriazine and at least one aldehyde selected from the group consisting of aliphatic monoaldehydes and multifunctional aliphatic aldehydes having the structure Y(CHO)n, where Y is an n-functional aliphatic residue, and n is greater than 1, where U is not dihydroxyethylene urea if (b) is (b1), (b2) reaction products of urea and/or cyclic ureas and formaldehyde, (b3) alkoxycarbonylaminotriazines, (b4) multifunctional isocyanates which may be partially or completely blocked, (b5) reaction products of phenols and aliphatic monoaldehydes, (b6) multifunctional epoxides, (b7) multifunctional aziridines, and (b8) multifunctional carbodiimides, as disclosed in WO/2012/044544 and repeated below for convenience. In the crosslinking agent, any of the crosslinkers (a) and (b) which have hydroxyl groups may be etherified with one or more linear, branched, or cyclic aliphatic alcohols.

The general formula (I) of the (a) portion of the crosslinking agent, the reaction product UA, is:

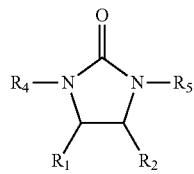

where $R_1$-$R_2$ and $R_4$-$R_5$ come from the cyclic urea and the multifunctional aldehyde selected as the reactants.

In one embodiment, the crosslinking agent has the reaction product of a cyclic urea U and a multifunctional aliphatic aldehyde A, portion (a), in a mixture with one or more of (b1), (b2), (b3), and (b5).

When using such mixtures of reaction products UA and at least one of the crosslinkers (b), the ratio of the mass M(UA) of the reaction product UA to the mass m(b) of the crosslinker (b), or to the sum m(b tot) of the masses of all crosslinkers (b), in the mixture in the case that more than one of these crosslinkers (b) is used, is from 1/99 to 99/1, preferably from 10/90 to 90/10, and particularly preferred, from 30/70 to 70/30. The masses m as used herein always stand for the mass of the active ingredient, and not the mass of a solution containing the active ingredient, if not expressly indicated otherwise.

The multifunctional aldehyde A has the formula OHC—R'—CHO where R' may be a direct bond or a divalent radical which may preferably be a linear, branched or cyclic aliphatic radical and may have from one to twenty carbon atoms, both these options for R' leading to a divalent aldehyde having exactly two —CHO groups, or an aliphatic divalent radical which may be linear, branched or cyclic and may have from one to twenty carbon atoms, which radical carries at least one additional aldehyde group —CHO, which latter option leads to trivalent or polyvalent aldehydes having at least three aldehyde groups.

"Multifunctional," as used herein, means a molecule having more than one functional group. Preferred aldehydes are divalent aliphatic aldehydes, particularly glyoxal, malonic dialdehyde, succinic dialdehyde, and glutaric dialdehyde. Especially preferred is glyoxal. It is also possible to use mixtures of these, preferably mixtures comprising a mass fraction of at least 50% of glyoxal, particularly preferred, at least 70% of glyoxal.

Glyoxal may be used for this invention in aqueous solution, as anhydrous solid which has to be cooled as its melting temperature is 15° C., or in the form of its dimer or trimer. Optionally, glyoxal may be a solid hydrate such as a dihydrate, or in the form of its addition product with sulphites or hydrogen sulphites which decompose under acidic conditions.

The cyclic ureas U which may be used according to the present invention have at least one unsubstituted amidic —NH group. These cyclic ureas U are cycloaliphatic or bicycloaliphatic compounds having an element of the structure —NH—CO—NH— within a ring structure, the total number of ring atoms preferably being from 5 to 7 (ethylene urea, 1,2-propylene urea, 1,3-propylene urea, 1,4-butylene urea or tetramethylene urea). Particularly preferred is ethylene urea or a mixture comprising ethylene urea, especially a mixture comprising at least a mass fraction of 50% of ethylene urea. In the case of a bicyclic compound, the simplest structure is glycoluril or acetylene diurea. Hydroxy functional ureas are not useful for the present invention.

The cyclic ureas may be substituted, preferably by alkyl groups on the N- or C-atoms, or both, the alkyl residues preferably having from one to four carbon atoms. At least one of the nitrogen atoms must remain unsubstituted to enable reaction with the aldehyde functional molecule. Preferably, the at least one cyclic urea U is selected from the group U1 consisting of ethylene urea, 1,2-propylene urea, hydantoin also known as glycolyl urea, and parabanic acid also known as oxalyl urea, and glycoluril, and from the group U2 consisting of the cyclic ureas U1 which additionally have at least one substituent on at least one of the nitrogen or carbon atoms of the said cyclic ureas U1, with the proviso that at least one nitrogen atom is unsubstituted, and the substituent is selected from the group consisting of linear, branched and cyclic alkyl groups having from 1 to 10 carbon atoms.

A particularly preferred combination is glyoxal reacted with ethylene urea, and optionally, either glyoxal, or ethylene urea, or both, in mixture with other multifunctional aldehydes and/or other cyclic ureas.

"Etherified," as used herein, means a product of an addition reaction of an aldehyde to a cyclic urea where a hydroxyl group bonded to a carbonyl carbon atom of an aldehyde molecule (denoted by bold print "C"), which was generated in the addition reaction below, is replaced by an alkoxy group —OR. X is the residue of a cyclic urea which may have been reacted with a multifunctional aldehyde or may also be part of a polymer or an oligomer chain, after taking out a —CO—NH— group. The (growing) polymer chain is denoted by "~~~~".

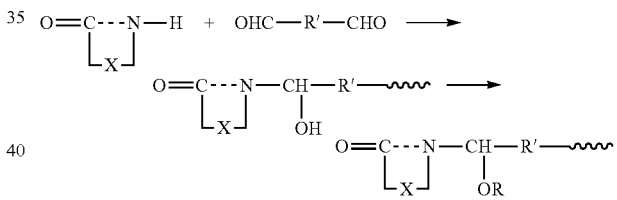

"Partially etherified," as used herein, means that both —OH and —OR groups bonded to carbonyl carbon atoms of the aldehyde are present in such "partially etherified" product, which at least partially etherified reaction product has as substituents on the carbonyl carbon atoms of the aldehyde A at least one kind of functional groups selected from the group consisting of hydroxyl groups —OH and alkoxy groups —OR. The at least partially etherified reaction product of this invention has as substituents on the carbonyl carbon atoms of the aldehyde A at least one kind of functional groups selected from the group consisting of hydroxyl groups —OH and alkoxy groups —OR characterized in that the groups —OR comprise alkoxy groups —OR$^6$ and —OR$^7$, where R$^6$ and R$^7$ are both selected independently from each other from the group consisting of linear, branched or cyclic alkyl groups having from one to twelve carbon atoms, which may be interrupted by one or more of —O—, —NR"—, —S—, where R" stands for H, or an alkyl group having from one to six carbon atoms, with the proviso that not two —O— or not two —S— atoms may be immediately adjacent, where in a first embodiment, R$^6$ and R$^7$ are different from each other, and R$^7$ has at least one carbon atom more than R$^6$, or in a second embodiment, R$^6$ and R$^7$ are the same.

"Partially etherified" in the context of the present invention means preferably that the ratio of the amount of substance n(—OR) of alkoxy groups generated by etherification with alcohols of hydroxyl groups which are formed by the reaction of an aldehyde group with an n(—CO—NH) group to the sum of the amount of substance n(—OR) of said alkoxy groups and the amount of substance n(—OH) of non-etherified said hydroxyl groups is at least 0.01 mol/mol.

In the preferred case of using ethylene urea as cyclic urea, and glyoxal as multifunctional aldehyde, —R'— is a direct bond, and —X— is —NH—CH$_2$—CH.

The aliphatic alcohols R—OH useful for the invention have at least one hydroxyl group, and from one to twelve carbon atoms, preferably one to eight carbon atoms, which may be interrupted by one or more of —O—, —NR"—, —S—, where R" stands for H, or an alkyl group having from one to six carbon atoms, with the proviso that not two —O— or not two —S— atoms may be immediately adjacent. They can be linear, branched or cyclic, preferably linear or branched, are preferably monoalcohols and preferably have from one to twelve, preferably one to eight carbon atoms, such as methanol, ethanol, n- and iso-propanol, and the isomeric butanols, particularly n-butanol, and iso-butanol, n-hexanol, or 2-ethylhexanol. Other preferred alcohols are ether alcohols of the formula R$^8$—(O—C$_n$H$_{2n}$)$_m$—OH where R$^8$ is an alkyl group having preferably from one to four carbon atoms, n is an integer of from 2 to 4, and m is an integer of from 1 to 10, such as ethylene glycol monomethylether, ethylene glycol monobutylether, triethylene glycol monoethylether, or dipropyleneglycol monomethylether. Among the cyclic aliphatic alcohols, cyclohexanol is preferred. A small amount, i.e., up to a mass fraction of 10% of the aliphatic alcohols used, may be difunctional or polyfunctional (having a functionality of three or more).

At least two different such alcohols R$^9$—OH and R$^{10}$—OH have to be used to prepare an at least partially etherified reaction product UA of cyclic ureas U and multifunctional aldehydes A according to the first embodiment of the invention, the molar ratio n(R$^9$—OH)/n(R$^{10}$—OH) of these being from 1 mol/99 mol to 99 mol/1 mol, preferably from 10 mol/90 mol to 90 mol/10 mol, and particularly preferably from 25 mol/75 mol to 75 mol/25 mol. The aliphatic alcohol R$^9$—OH has at least one carbon atom in its molecule more than there is in R$^{10}$—OH. In a preferred embodiment, methanol is used as R$^9$—OH, where R$^{10}$—OH may be ethanol, or a higher homologue thereof having up to twelve carbon atoms, including branched and cyclic aliphatic monoalcohols. Preferred as R$^{10}$—OH are ethanol, n- and iso-propanol, n-butanol, sec.-butanol, iso-butanol, n-pentanol, 2- and 3-methyl-1-butanol, n-hexanol, n-octanol, 2-ethyl-1-hexanol, 1-decanol, 1-dodecanol, and mixtures of these, as well as ether alcohols such as ethylene glycol monomethylether, ethylene glycol monobutylether, triethylene glycol monoethylether, or dipropyleneglycol monomethylether. If methanol is used as R$^9$—OH, the molar ratio n(R$^9$—OH)/n(R$^{10}$—OH) of these is especially preferably from 15 mol/85 mol to 45 mol/55 mol, preferably from 20 mol/80 mol to 40 mol/60 mol. It is further preferred that the alcohol R$^9$—OH is significantly water-miscible, meaning that mixtures of water and R$^9$—OH form homogeneous mixed phases. It is further preferred that the alcohol R$^9$—OH is significantly water-miscible and that the alcohol R$^{10}$—OH has at most limited solubility in water, limited solubility meaning that the aqueous phase does not contain a mass fraction of more than 30% of the alcohol R$^2$—OH. In this embodiment wherein R$^9$ and R$^{10}$ are different from each other, R$^{10}$ has at least one carbon atom more than R$^9$, and the ratio of the number of —OR groups to the sum of the number of —OH groups and the number of —OR groups which are substituents on the carbonyl carbon atoms of the aldehyde A in the reaction product UA is more than 60%, the number of —OR groups being the sum of the number of —OR$^9$ groups and the number of —OR$^{10}$ groups.

It is further preferred that the degree of etherification of the reaction product UA, measured as the ratio n(RO—)/n(U) of the amount of substance n(RO—) of alkoxy groups to the amount of substance n(U) of cyclic urea U chemically bound in the reaction products, is at least 1.1 mol/mol.

It is further preferred that the reaction product UA has a ratio of the amount of substance of residual -NH groups to the amount of substance of moieties derived from the cyclic urea U of not more than 0.2 mol/mol.

Methods for making the reaction product UA and the mixture of crosslinkers for the crosslinking agent are disclosed in U.S. application Ser. No. 13/876,559, previously published as WO/2012/044544, the remainder of which, not reproduced above, is incorporated herein by reference.

Amino Resin

A melamine formaldehyde resin is used in the methods disclosed herein. In particular, CYMEL® 385 melamine formaldehyde resin was used. However, other CYMEL brand MF resins may be used or other brand name MF resins, alone or as mixtures to comprise the melamine formaldehyde prepolymer. The melamine formaldehyde resin may be one that includes phenol, such as a resorcinol urea formaldehyde resin.

See general formula (II) below for an illustration of the unit cell believed to be formed by each of the methods disclosed herein for melamine formaldehyde polymer reacted with the crosslinking agent, in particular portion (a) of the crosslinking agent, the cyclic urea thereof interacting with the amine, alcohol and ether moieties to produce a structurally different polymer material.

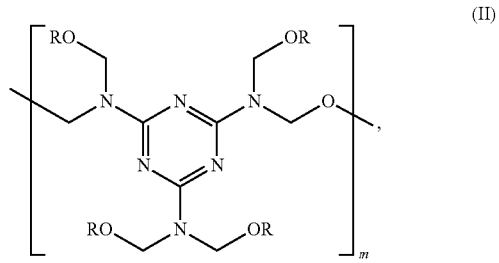

(II)

The capsules made by the methods disclosed herein can be microcapsules or macrocapsules, which will typically have a relatively high payload of the core material relative to the amount of material forming the shell or capsule wall. The payload of core material in any of the capsules may be about 10% to about 90% by weight, preferably at least 50%, more preferably at least 70%, and even more preferably at least 80%. In any of the capsules made by the methods disclosed herein, the payload of core material may be about 70% to about 80% by weight.

The size of the capsules made by the methods disclosed herein can vary depending upon one or more of the steps of the method. The capsules can be microcapsules or macrocapsules. A microcapsule is typically one having a diameter in the range from about 10 μm to about 10000 μm and more typically from about 30 μm to about 6000 μm. The capsule diameter selected depends upon a user's intended application or use for the microcapsules. For example, flavor microcapsules having diameters of 800 μm to 1200 μm are used in chewing gum products, whereas microcapsules having diameters of 30 μm to 1000 μm are used in construction for delivering phase change material, humidified or anti-fouling agents into concrete. In textiles, microcapsules having diameters of 1 μm to 500 μm are used for anti-allergic mattresses. Other applications include food applications like probiotic microcapsule formulations or fermentation agents in champagne production.

"Macrocapsules" may be as disclosed in U.S. Pat. Nos. 6,703,127 and 5,415,222, herein incorporated by reference in their entirety. Macrocapsules as taught in these patents comprise a plurality of microcapsules having a diameter or particle size (if not generally spherical) typically in a range from about 1 μm to 100 μm, more preferably from about 2 μm to 50 μm. The diameter or particle size (if not generally spherical) for the macrocapsules may be from about 1000 μm to 10,000 μm. Macrocapsules may provide a thermal energy storage composition that more efficiently absorbs or releases thermal energy during a heating or a cooling process than individual PCM containing microcapsules.

The microcapsules may be made by the methods disclosed with different wall thicknesses. Typically, the wall material should be thick enough to contain the core material according to the desired properties. Desired properties can include, but are not limited to, protection against the environment, full enclosure without leaks or diffusion out of the capsule, slow diffusion, triggered release, sustained or controlled release, etc. The wall thickness may be about 0.1 to about 500 μm. In one embodiment, the wall may be about 0.2 to about 0.6 μm thick with a nominal (mean) thickness of about 0.4 μm. Depending on the application, the shell can be designed to withstand rupture under high pressure to rupture under minimal pressure, dissolution under change of pH, presence of humidity or other solvents, time dissolution, etc., which typically requires a thicker wall.

Those skilled in the art will appreciate that the capsule size and wall thickness may be varied by the steps of methods disclosed herein, for instance, adjusting the amount of mixing energy applied to the materials immediately before wall formation commences. Capsule wall thickness is also dependent upon many variables, including the typical process parameters as, but not limited to, pH, temperature, viscosity, and speed of the mixing unit used in the encapsulation process.

Since the capsules made by the methods disclosed herein have greatly reduced free formaldehyde, an analytical method capable of detecting low ppm values accurately, with reproducibility, is needed. The method used herein is the colorimetric method taught by T. Nash, Biochem J., 55, 416 (1953), which involves a condensation reaction between formaldehyde and a reagent consisting of a β-diketone and ammonium acetate. In the Nash method, formaldehyde reacts with a reagent of 2,4-pentanedione and concentrated aqueous ammonium acetate solution to form the highly colored adduct 3,5-diacetyl-1,4-dihydro-2,6-lutidine. The concentration can be accurately determined vs. a calibration curve via an absorbance reading by UV-Vis spectroscopy at 420 nm. This reaction is as shown below:

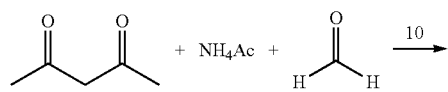

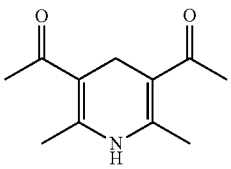

To demonstrate the sensitivity and capability of the method, known concentrations of free formaldehyde were carefully prepared and measured. The charts below show the average reading and standard deviation at the different concentrations. The data clearly indicates that the Nash method for free formaldehyde is sensitive enough to measure down to at least 5 ppm accurately.

TABLE 1

5 ppm

| Target PPM | Rdg 1 | Rdg 2 | Rdg 3 |
|---|---|---|---|
| 5 ppm | 4.877 | 4.755 | 4.777 |
| | | Average | 4.803 |
| | | STD | 0.0649 |
| | | σ | 0.0649 |
| | | 2 σ | 0.1298 |
| | | 3 σ | 0.1947 |

TABLE 2

10 ppm

| Target PPM | Rdg 1 | Rdg 2 | Rdg 3 |
|---|---|---|---|
| 10 ppm | 10.146 | 10.228 | 10.177 |
| | | Average | 10.184 |
| | | STD | 0.0413 |
| | | σ | 0.0413 |
| | | 2 σ | 0.0826 |
| | | 3 σ | 0.1238 |

TABLE 3

15 ppm

| Target PPM | Rdg 1 | Rdg 2 | Rdg 3 |
|---|---|---|---|
| 15 ppm | 15.461 | 15.300 | 15.338 |
| | | Average | 15.366 |
| | | STD | 0.0844 |
| | | σ | 0.0844 |
| | | 2 σ | 0.1688 |
| | | 3 σ | 0.2533 |

TABLE 4

30 ppm

| Target PPM | Rdg 1 | Rdg 2 | Rdg 3 |
|---|---|---|---|
| 30 ppm | 31.003 | 31.144 | 31.090 |
| | | Average | 31.079 |
| | | STD | 0.0711 |
| | | σ | 0.0711 |
| | | 2 σ | 0.1422 |
| | | 3 σ | 0.2132 |

EXAMPLES

Example 1

Pre-resin Addition of the Crosslinking Agent 888 g of melamine formaldehyde microcapsules in a slurry were made by the methods disclosed herein that include the pre-resin addition of the crosslinking agent. The microcapsules made in this Example 1 are to have a diameter of about 10 μm to about 40 μm (mean diameter of 15 μm to 24 μm) having a core material that is a blend of octadecane and a nucleator (that is a phase change material). These capsules are formed by adding a crosslinking agent as described above to the emulsion comprising the core material before the melamine formaldehyde resin is added thereto. The particular crosslinking agent was A07-17 crosslinking agent from Allnex USA.

The nucleator is added to the core phase material prior to emulsification and heated to 70° C. for 1 hour. The core material is emulsified in a mixture of EMA-DEA copolymer solution and dilution water. Then, the crosslinking agent is added to the emulsified mixture with mixing for at least an hour before any melamine formaldehyde resin is added. The final product is collected as a capsule wet cake. More specifically:

Phase A: Aqueous Phase:
1. Add 176.72 grams of EMA-DEA solution and 200 g of DI water to a 1500 ml beaker.
2. Heat with mixing to 45° C. and maintain the temperature until after emulsification.

Phase B: Core Phase:
1. Weigh 268 grams of melted octadecane and 2.68 g of a nucleator and add to a 600 ml beaker.
2. Mix at 70° C. for 1 hour, then cool to 55° C. with mixing.

Phase C: Emulsification:
1. Slowly add Phase B to Phase A while increasing the mixing speed to 300 RPM.
2. Mix for 50 minutes to form a coarse emulsion.
3. Add 23.58 grams of A07-17 crosslinking agent in 22.92 grams of DI water to the emulsion with mixing for about an hour.
4. Turn on homogenizer at 6500 RPM, with the temperature maintained at 45° C., for 2 minutes and check the particle size using a microscope; if needed, run homogenizer again and repeat as needed.
5. Add 26.8 grams of melamine formaldehyde resin (CYMEL® 385 MF resin) in 25.8 grams of DI water to the emulsion.
6. Run the homogenizer approximately 1 minute at 6500 RPM. Check the particle size with microscope; if needed, repeat with 30 second runs of the homogenizer until particle size mean is approximately 18 microns with less than 1 percent greater than 40 microns.
7. 10 minutes after the first addition of melamine formaldehyde, add 8.6 grams of melamine formaldehyde resin (CYMEL® 385 MF resin) in 8.6 grams of DI water to the emulsion.
8. If the particle size is within the desired range for the capsules to be made, remove the homogenizer; if not, repeat with 15 second runs of the homogenizer until desired size is achieved Phase D: Complete Capsule Formation
1. 30 minutes after the first addition of melamine formaldehyde, slowly drip in potassium dihydrogen phosphate solution (pH 4.0) over 10-15 minutes.
2. Slowly ramp temperature from 45° C. to 65° C. over approximately 90 minutes.
3. When the temperature reaches 65° C., add 16.44 grams of urea prill.
4. Maintain temperature at 65° C. for 4 hours, then cool to below 30° C.
5. Adjust the pH to 7 using 45% potassium Hydroxide drop-wise.
6. Filter and wash the microcapsules.

After all filtrate was removed, the wet cake was gently broken up and analyzed using the Nash method for free formaldehyde. Particle size distribution was determined using a Malvern Mastersizer 2000 Particle Analyzer, free wax by gas chromatography, and percent solids on a Denver Instrument IR-200 Solids Analyzer. The capsules were measured for melting point and total enthalpy ($\Delta H$) of the melt curve in a differential scanning calorimetry model Perkin Elmer DSC 4000 after thermal cycling the capsules to determine any loss of enthalpy or wall structural integrity. The thermal cycle was conducted 50 times according to the following protocol:

Hold at 10° C. for 30 min.
Heat to 40° C. at 1° C./min.
Hold at 40° C. for 30 min.
Cool to 10° C. at 1° C./min.

The capsules were also analyzed for percent of free wax. The data from these various tests are reported in FIG. 3. This data shows that the free formaldehyde levels for the wet cake product after aging for up to four weeks did not precipitously rise as do the control samples that were made without the crosslinking agent, even with the urea present to act as a formaldehyde scavenger. Note in the case where the least amount of crosslinking agent was added, the rise in free formaldehyde after 3 weeks was −2.0 ppm. In contrast, the control, with only the urea as a scavenger, experienced a rise in free formaldehyde over three weeks of 116 ppm (from 139 ppm to 255 ppm). The explanation for the hydrolytic protection of the wall lies in the fact the polymer produced with surfactant, cross linker and amino resin is structurally different in such a way to block the formation of formaldehyde.

In a scale up of Example 1, Table 6 displays the data for capsules from a 10 gallon run on a reactor scale designed to model the mass and heat transfer of a 1000 gallon vessel. Here, the 1.5:1 ratio was selected for the melamine formaldehyde resin to crosslinking agent because it has the lowest free formaldehyde levels in the lab trials in FIG. 3.

TABLE 6

10 Gallon Results 60% CYMEL ® 385 MF resin/40% Crosslinking agent

| Batch | Free Wax, % | 10% Wt. Loss TGA, ° C. | MP ° C. | M $\Delta H$ ° C. | Free HCHO % Day 1 | Free HCHO % 3 Weeks | Comments |
|---|---|---|---|---|---|---|---|
| 122-022 | 0.38 | 383.6 | 28.64 | 190.69 | 0.0024 | 0.0033 | Add Cross linker 20 minutes before addition of resin |

TABLE 6-continued

10 Gallon Results 60% CYMEL ® 385 MF resin/40% Crosslinking agent

| Batch | Free Wax, % | 10% Wt. Loss TGA, °C. | MP °C. | M ΔH °C. | Free HCHO % Day 1 | Free HCHO % 3 Weeks | Comments |
|---|---|---|---|---|---|---|---|
| 122-022 | 0.54 | 388.6 | 29.08 | 192.21 | 0.0024 | 0.0045 | Thermocycled 50 cycles |
| 122-033 | 0.58 | 386.4 | 28.88 | 186.6 | 0.0024 | | Thermocycled 50 cycles |

The capsule from the scale up had slightly higher initial free formaldehyde, but still way below the levels of the control capsules shown in FIG. 2. Compare 24 ppm here to more than 180 ppm for the in plant control. Moreover, the capsules made with the crosslinking agent show very low increases in free formaldehyde after aging for three weeks, only an increase of 9 ppm compared to an increase of 130 ppm for the control in FIG. 3 that included the urea scavenger. This is a far superior result. Moreover, even after the capsules were thermocycled per the procedure set forth herein, aging thereafter only showed an additional increase of about 10 ppm with acceptable values for free wax, 10% weight Loss TGA, and M ΔH.

Example 2

First Resin Addition of the Crosslinking Agent

The method set forth above in detail in Example 1 was repeated but modified such that the crosslinking agent was added to the emulsion with the first addition of melamine formaldehyde, rather than before it.

Example 3

Second Resin Addition of the Crosslinking Agent

The method set forth above in detail in Example 1 was repeated but modified such that the crosslinking agent was added to the emulsion with the second addition of melamine formaldehyde, rather than before or with the first resin addition of melamine formaldehyde.

Example 4

First and Second Resin Addition of the Crosslinking Agent

The method set forth above in detail in Example 1 was repeated but modified such that the crosslinking agent was added to the emulsion partially with the first resin addition of melamine formaldehyde and then completed with the second resin addition of melamine formaldehyde, rather than before both additions.

The results of comparison of initial free formaldehyde levels for capsules made according to Examples 1-4 over a range of amino resin to crosslinking agent weight ratios are shown in FIG. 2. In comparing this free formaldehyde data, quite surprisingly, the lowest free formaldehyde level in the final isolated wet cake product was obtained by first allowing the crosslinking agent to interact with the emulsion of surfactant, water and the core material before the addition of the melamine formaldehyde resin. Not to be bound by theory, but one can speculate that the reason we obtain the remarkably low free-formaldehyde levels and suppressed release of formaldehyde by hydrolysis is that the crosslinking agent bound to the surfactant and in such bound form is efficiently delivered to the subsequently added melamine formaldehyde resin in such a way as to react with the resin to tie up the sites that would result in formaldehyde from hydrolysis and also reacts in situ with formaldehyde that is released during the polymerization process.

The embodiments of this invention shown in the drawings and described above are exemplary of numerous embodiments that may be made within the scope of the appended claims. It is contemplated that numerous other configurations of microcapsules may be created by taking advantage of the disclosed two-stage polymerization method of making the microcapsules. In short, it is the Applicants' intention that the scope of the patent issuing herefrom be limited only by the scope of the appended claims.

What is claimed is:

1. A capsule having a polymer wall comprising a melamine formaldehyde reacted with a crosslinking agent to form a unit cell according to the formula:

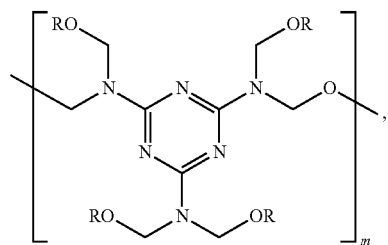

wherein R is H or CH$_3$.

2. The capsule of claim 1, wherein the crosslinking agent comprises
   (a) a reaction product of a cyclic urea (U) and a multifunctional aldehyde (A), and
   (b) at least one crosslinker selected from the group consisting of
      (b1) reaction products of an aminotriazine and at least one aldehyde selected from the group consisting of aliphatic monoaldehydes and multifunctional aliphatic aldehydes having the structure Y(CHO)$_n$, where Y is an n-functional aliphatic residue, and n is greater than 1, where U is not dihydroxyethylene urea if the crosslinker (b) is (b1),
      (b2) reaction products of urea and/or cyclic ureas and formaldehyde,
      (b3) alkoxycarbonylaminotriazines,
      (b4) multifunctional isocyanates, optionally partially or completely blocked,
      (b5) reaction products of phenols and aliphatic monoaldehydes,
      (b6) multifunctional epoxides,
      (b7) multifunctional aziridines, and
      (b8) multifunctional carbodiimides, wherein any of the crosslinkers (a) and (b) which have hydroxyl groups are optionally etherified with one or more linear, branched, or cyclic aliphatic alcohols.

3. The capsule of claim 1, wherein the polymer wall has a thickness of about 0.2 μm to about 0.6 μm.

4. The capsule of claim 1, wherein the polymer wall has less than 60 ppm initial free formaldehyde.

5. The capsule of claim 1, wherein the polymer wall has less than 40 ppm initial free formaldehyde.

6. The capsule of claim 1, wherein the polymer wall has less than 20 ppm initial free formaldehyde.

7. The capsule of claim 1, wherein the polymer wall has less than 10 ppm initial free formaldehyde.

8. The capsule of claim 7, wherein the polymer wall has less than 20 ppm of free formaldehyde during four weeks after formation.

9. The capsule of claim 7, wherein the polymer wall has less than 40 ppm of free formaldehyde during four weeks after formation.

10. The capsule of claim 1, wherein the polymer wall has free formaldehyde below 40 ppm from day 1 to week 4.

11. The capsule of claim 1, wherein the polymer wall has free formaldehyde below 20 ppm from day 1 to week 4.

12. The capsule of claim 1, wherein the capsules are microcapsules or macrocapsules.

13. A capsule comprising a polymer wall comprising a melamine formaldehyde reacted with a crosslinking agent, wherein the polymer wall has a FT-IR Spectrum of FIG. 4.

14. The capsule of claim 13, wherein the capsules are microcapsules or macrocapsules.

15. The capsule of claim 13, wherein the polymer wall has less than 60 ppm initial free formaldehyde.

16. The capsule of claim 13, wherein the polymer wall has less than 40 ppm initial free formaldehyde.

17. The capsule of claim 13, wherein the polymer wall has less than 20 ppm initial free formaldehyde.

18. The capsule of claim 13, wherein the polymer wall has less than 10 ppm initial free formaldehyde and less than 20 ppm of free formaldehyde during four weeks after formation.

19. The capsule of claim 13, wherein the polymer wall has less than 10 ppm initial free formaldehyde and less than 40 ppm of free formaldehyde during four weeks after formation.

20. The capsule of claim 13, wherein the polymer wall has free formaldehyde below 40 ppm from day 1 to week 4.

21. The capsule of claim 13, wherein the polymer wall has free formaldehyde below 20 ppm from day 1 to week 4.

22. A capsule having a polymer wall comprising a melamine formaldehyde reacted with a crosslinking agent that comprises
 (a) a reaction product of a cyclic urea (U) and a multifunctional aldehyde (A), and
 (b) at least one crosslinker selected from the group consisting of
  (b 1) reaction products of an aminotriazine and at least one aldehyde selected from the group consisting of aliphatic monoaldehydes and multifunctional aliphatic aldehydes having the structure $Y(CHO)_n$, where Y is an n-functional aliphatic residue, and n is greater than 1, where U is not dihydroxyethylene urea if the crosslinker (b) is (b 1),
  (b2) reaction products of urea and/or cyclic ureas and formaldehyde,
  (b3) alkoxycarbonylaminotriazines,
  (b4) multifunctional isocyanates, optionally partially or completely blocked,
  (b5) reaction products of phenols and aliphatic monoaldehydes,
  (b6) multifunctional epoxides,
  (b7) multifunctional aziridines, and
  (b8) multifunctional carbodiimides,
 wherein any of the crosslinkers (a) and (b) which have hydroxyl groups are optionally etherified with one or more linear, branched, or cyclic aliphatic alcohols.

23. The capsule of claim 22, wherein the polymer wall has a thickness of about 0.2 μm to about 0.6 μm.

24. The capsule of claim 22, wherein the polymer wall has free formaldehyde below 40 ppm from day 1 to week 4.

25. The capsule of claim 22, wherein the polymer wall has free formaldehyde below 20 ppm from day 1 to week 4.

26. The capsule of claim 22, wherein the capsules are microcapsules or macrocapsules.

27. The capsule of claim 22, wherein the polymer wall has less than 10 ppm initial free formaldehyde and less than 20 ppm of free formaldehyde during four weeks after formation.

28. The capsule of claim 22, wherein the polymer wall has less than 10 ppm initial free formaldehyde and less than 40 ppm of free formaldehyde during four weeks after formation.

\* \* \* \* \*